United States Patent [19]

Welner

[11] Patent Number: 4,682,888
[45] Date of Patent: Jul. 28, 1987

[54] SPECTRAL ANALYZER AND DIRECTION INDICATOR

[75] Inventor: Jerome M. Welner, Manhattan Beach, Calif.

[73] Assignee: Hughes Aircraft Company, Los Angeles, Calif.

[21] Appl. No.: 686,363

[22] Filed: Dec. 26, 1984

[51] Int. Cl.[4] .......................... G01N 21/01; G01J 3/36; G01B 11/26
[52] U.S. Cl. ........................................ 356/73; 356/141
[58] Field of Search .......................... 356/73, 138–142, 356/147, 152, 324, 328, 334, 346, 356, 358, 363, 1, 28, 28.5, 5, 354, 153–154; 250/237 G, 226, 203 R, 203 LB; 350/162.18

[56] References Cited

U.S. PATENT DOCUMENTS

| | | | |
|---|---|---|---|
| 3,515,459 | 6/1970 | Wood | 350/162.18 |
| 3,825,350 | 7/1974 | Wilmot | 356/138 |
| 3,929,398 | 12/1975 | Bates | 250/226 X |
| 3,992,099 | 11/1976 | Laughlin | 356/73 |
| 4,037,959 | 7/1977 | Bumgardner | 356/73 |
| 4,136,568 | 1/1979 | Seymour | 356/141 X |
| 4,184,767 | 1/1980 | Hughes et al. | 356/141 X |
| 4,249,823 | 2/1981 | Task | 250/237 G X |
| 4,351,611 | 9/1982 | Leif | 356/328 |
| 4,500,200 | 2/1985 | Kleinhans | 356/152 |

OTHER PUBLICATIONS

Patents Abstracts of Japan, vol. 6, No. 121, Jul. 6, 1982, pp. P-126-999 & JP, A, 5749822 (Hitachi Seisakusho) Mar. 24, 1982.

*Primary Examiner*—Vincent P. McGraw
*Attorney, Agent, or Firm*—L. B. Sternfels; A. W. Karambelas

[57] ABSTRACT

Spectral analyzer and direction indicator systems (10,20,30,40,50) are disclosed and include optical elements (11,17,27b,33b,35b,39b) for providing optical information which depend on incidence direction and spectral content, and further includes optical elements (23,27a,33a,35a,39a) for providing non-diffracted optical information which depend on incidence direction. The respective optical information as detected by detector arrays (15,21,25,31,37) are utilized together to provide information for specifically identifying spectral content and incidence direction of collimated or nearly collimated radiation.

17 Claims, 10 Drawing Figures

SPECTRAL ANALYZER AND DIRECTION INDICATOR

BACKGROUND OF THE INVENTION

1. Field of the Invention

The disclosed invention generally relates to apparatus for detecting essentially collimated radiation, measuring wavelength values within that radiation, determining the direction to the source of that radiation within an extended field-of-view, and discriminating between essentially coherent (e.g., laser) and noncoherent radiation, all of which is accomplished simultaneously and in staring fashion (e.g., without scanning).

2. Background Art

The prior art includes a variety of devices for detecting coherent radiation. Examples of such prior art devices are discussed below.

U.S. Pat. No. 3,824,018, issued to Crane, Jr., discloses an unequal path interferometer. The interferometer scans so as to cause a change in the difference in the two optical paths which will modulate the intensity of the recombined coherent radiation by varying interference effects.

U.S. Pat. No. 4,147,424, issued to Foster, et al., discloses a system for detecting the presence of coherent radiation having an interference filter with a pair of partially reflective mirrors, with the spacing between the mirrors being varied sinusoidally to change the transmission wavelength of the mirrors. The output is compared to an established reference signal to produce an identifying indication of the detected radiation.

U.S. Pat. No. 4,170,416 discloses apparatus for detecting the presence of coherent radiation in the presence of incoherent ambient radiation, and for determining the intensity, the wavelength, or the threshold direction of such coherent radiation. The apparatus includes a Fabry Perot etalon having three regions of different thickness.

U.S. Pat. No. 4,183,669, issued to Doyle, and U.S. Pat. No. 4,185,919, issued to Williamson et al., disclose a quadrant detection system using an objective lens and a holographic lens. The holographic lens has lens elements in four quadrants with each quadrant having a focal point corresponding to the position of adjacent photoelectric detectors.

U.S. Pat. No. 3,858,201, issued to Foster, discloses a system for determining a direction from which an illuminating laser beam is received. The system includes a cylindrical optical system for focusing a laser beam as a sharp line image.

U.S. Pat. No. 4,309,108, issued to Siebert, discloses an analyzer for coherent radiation for discriminating wavelength from a single pulse or from a continuous wave radiation and to determine the relative angular position of the source of the radiation. The analyzer includes at least three unequal length path interferometers and detectors for detecting the radiation transmitted through the interferometers.

The foregoing prior art devices are generally complex, relying to a large extent on classical electrooptical techniques and/or the use of scanning.

While the prior art devices exhibit various combinations of features for measuring characteristics of radiation, none, however, has the versatility or all of the particular and extensive features of the disclosed invention combined into a single instrument without the need to scan.

SUMMARY OF THE INVENTION

It is, therefore, an object of this invention is to provide a spectral analyzer and direction indicator that without resorting to scanning detects essentially collimated radiation, and with respect to that radiation, simultaneously measures quantities that uniquely determine (1) its wavelength values within an extended spectural band, (2) its direction within an extended field-of-view, and (3) its coherence length so as to discriminate beween radiation that is coherent, or essentially coherent, and non-coherent. The principle of operation for the disclosed invention applies equally well in any spectral region (e.g., from ultraviolet to microwave) for which there exist suitable dispersive and detecting elements.

It is also an object of the present invention to provide an efficient spectral analyzer and direction indicator responsive to essentially collimated radiation.

Another object of the invention is to provide a rugged and versatile spectral analyzer and direction indicator responsive to essentially collimated radiation.

Still another object of the invention is to provide a spectral analyzer and direction indicator responsive to radiation that is either essentially coherent (e.g., laser) or non-coherent.

A further object of the invention is to provide a non-scanning spectral analyzer and direction indicator which detects essentially collimated radiation, discriminates between radiation that is essentially coherent (e.g. laser) and non-coherent (i.e., spectrally broad), and which provides within a specified but extended field-of-view an indication of the direction from which that radiation is received.

An additional object of this invention is to provide a staring spectral analyzer and direction indicator that provides indication of wavelength values contained within the detected radiation, which can be either coherent or non-coherent, and that can occur anywhere within a specified but extended spectral interval.

Still a further object of the invention is to provide a spectral analyzer and direction indicator responsive to collimated or essentially collimated radiation and capable of discriminating a plurality of sources.

A still further object of the invention is to proivde a spectral analyzer and direction indicator that is rugged enough to be readily utilized in vehicles.

The foregoing and other objects and purposes of the invention are accomplished in a spectral analyzer and direction indicator system having one or more spectrally dispersive optical channels wherein each dispersive optical channel includes elements for dispersing incident radiation and for focusing the dispersed radiation, and further having a non-dispersing optical channel which focuses incident radiation. The spectral analyzer and direction indicator system further includes detector apparatus for detecting the outputs from each of the dispersive (i.e., diffractive) and non-dispersive optical channels.

In further embodiments of the disclosed spectral analyzer and direction indicator, an optical channel includes both non-dispersing (sometimes simply reflecting) optical elements and spectrally dispersing optical elements. The non-spectrally dispersing element provides information indicative of the direction of the source of incident radiation and the spectrally dispersing element provides information indicative of both the incident direction and the spectral content of the incident radiation.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION

In the following detailed description and in the several figures of the drawing, like elements are identified with like reference numerals.

While the disclosed invention is useful with different kinds of essentially collimated radiation (e.g., from ultraviolet to microwave), the disclosed systems will be primarily described relative to laser radiation. This will facilitate the understanding of the principles involved which can then be applied to other sources of radiation.

For reference purposes, the following spectral analyzer and direction indicator systems are discussed relative to a three dimensional right-handed Cartesian coordinate system and directional angles measured relative to the Cartesian coordinate system. In the perspective views of FIGS. 1, 4, and 5 and x, y and z axes are shown. In the elevational view of FIG. 2, the y and z axes are shown, while the x-axis is understood to be orthogonal.

Figure 1:
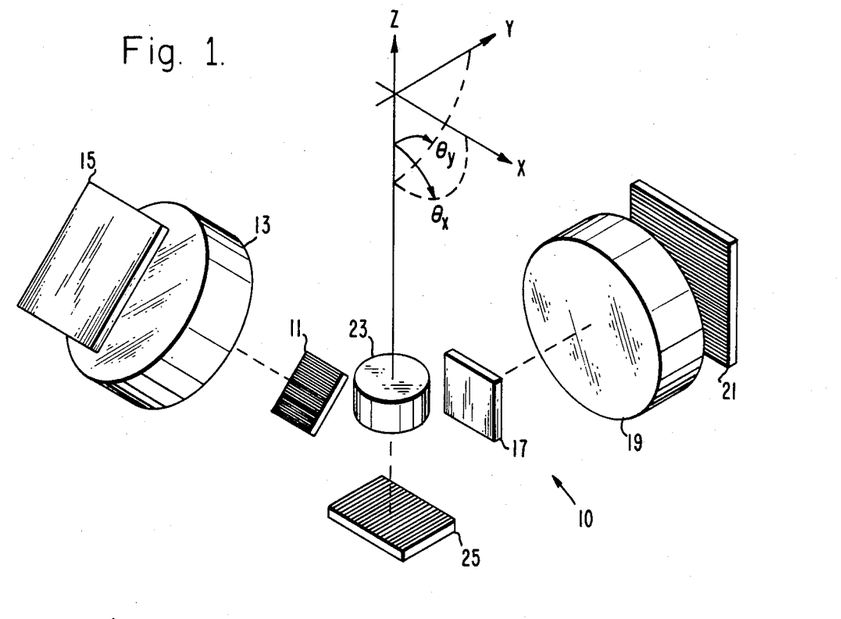
FIG. 1 is a perspective schematic diagram of one form of a disclosed spectral analyzer and direction indicator system.

As references for incidence direction, the angles $\theta x$ and $\theta y$, are provided, whereby $\theta x$ is measured in the xz plane, and $\theta y$ is measured in the yz plane. FIG. 1 illustrates the measurement of $\theta y$ along the z-axis relative to the z-axis, and also illustrates the measurement of $\theta x$ along the x-axis relative to the z-axis.

The z-axis can be considered as being along the center line of the external field of view (FOV), which refers to the field of view over which a spectral analyzer and direction indicator can receive incident radiation. In other words, external FOV refers to the section of space which a spectral analyzer and direction indicator can observe. Internal field of view (FOV) in the disclosure generally refers to the field of view of the optical components within a spectral analyzer and direction indicator. Such optical components include reflectors, lenses, and detector arrays.

Referring now to FIG. 1, schematically shown therein is a spectral analyzer and direction indicator system 10 which includes a left-side reflection grating 11, and an associated analytical optical system 13 which is shown schematically as a simple lens. The optical system 13 functions to collect and focus the diffracted rays from the reflection grating 11. A detector array 15 receives the focused rays from the optical system 13. For ease of reference, the reflection grating 11, the optical system 13, and the detector array 15 will be considered as an independent optical channel which provides diffracted optical information.

The spectral analyzer and direction indicator system 10 further includes a right-side reflection grating 17, and an associated analytical optical system 19 which is shown schematically as a simple lens. The optical system 19 functions to collect and fucus the diffracted rays from the reflection grating 17. A detector array 21 receives the focused rays from the optical system 19. Similarly to the left-side elements discussed above, the reflection grating 17, the optical system 19, and the detector array 21 are considered as an independent optical channel which provides diffracted optical information.

The spectral analyzer and direction indicator system 10 further includes an optical system 23, illustrated as a simple lens, for focusing incident radiation to a detector array 25. The radiation provided to the detector array 25 is not spectrally dispersed. The optical system 23 and the detector array 25 form an optical channel for providing non-diffracted optical information.

The reflection gratings 11 and 17 have rulings which are parallel to the x-axis. Therefore, as is well known, for each reflection grating there is an angle of diffraction which is a function of both wavelength and incidence angle measured relative to the normal to the reflection grating. Specifically, that angle of diffraction is measured in a plane that is parallel to the yz plane.

Figure 2:
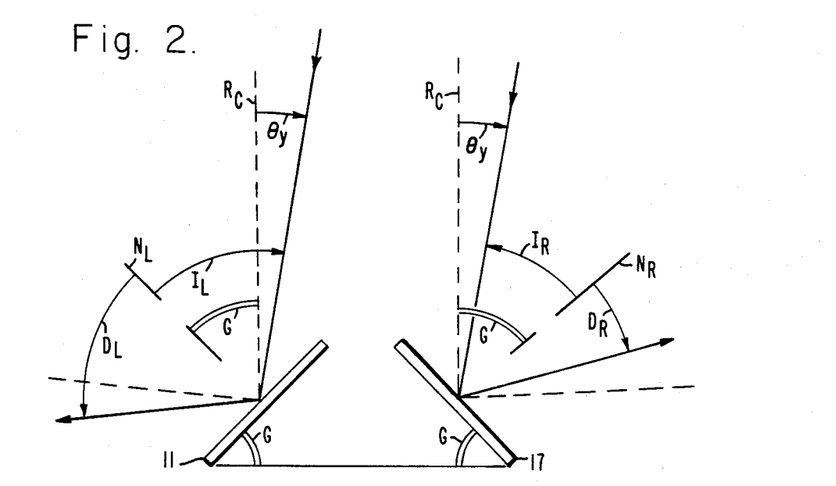
FIG. 2 is a schematic elevation diagram illustrating the parameters and sign conventions used in describing the disclosed spectral analyzer and direction indicator systems.

For ease of discussion, the parameters and sign conventions for the spectral analyzer and direction indicator system 10 are shown in FIG. 2. Relative to a line parallel to the y-axis, the left side reflection grating 11 and the right side reflection grating 17 are each inclined at an angle G. For symmetry and convenient analysis, the reflection gratings 11 and 17 are each inclined at the same angle G. By way of example, the angle G may be 45 degrees and would be set as required by the particular optical design.

Associated with the left side reflection grating 11 is a line $N_L$ which is normal to the surface of the grating 11. The angle of incidence of $I_L$ of the incoming beam as to the left side reflection grating 11 is measured relative to the normal $N_L$. The angle $I_L$ is positive in the clockwise direction. The angle of diffraction $D_L$ as to the left side reflection grating 11 is measured relative to the normal $N_L$.

Associated with the right side reflection grating 17 is a line $N_R$ which is normal to the surface of the grating 17. The angle of incidence $I_R$ of the incoming beam as to the right side reflection grating 17 is measured relative to the normal $N_L$. The angle of incidence $I_R$ is positive in the counter clockwise direction. The angle diffraction $D_R$ as to the right side reflection grating 17 measured relative to the normal $N_R$.

In FIG. 2, the convention is such that angles of rays on opposite sides of a normal to a reflection grating have opposite algebraic signs.

With equal grating inclination angles G, the angles of incidence $I_L$ and $I_R$ are related as follows:

$$I_L = G + \theta y \quad \text{(Eq. 1)}$$

$$I_R = G - \theta y \quad \text{(Eq. 2)}$$

$$I_L + I_R = 2G \quad \text{(Eq. 3)}$$

Thus, for a given incident beam within the external FOV, the sum of the angles of incidence on the reflector gratings 11 and 17 is always equal to twice the inclination angle G.

As to the left side reflection grating 11, the following rating equation is applicable:

$$\sin D_L = nW/d - \sin I_L \quad \text{(Eq. 4)}$$

The symbols represent the following:

Table I $I_L$: angle of incidence, left side
$D_L$: angle of diffraction, left side
W: wavelength
n: order of diffraction
d: spacing of adjacent rulings on grating Relative to the right side reflection grating 17, a similar grating equation is applicable:

$$\sin D_R = nW/d - \sin I_R \quad \text{(Eq. 5)}$$

The symbols represent the following:

Table II $I_R$: angle of incidence, right side
$D_R$: angle of diffraction, right side
W: wavelength
n: order of diffraction
d: spacing of adjacent rulings on grating In the disclosed system 10, the reflection gratings 11 and 17 are substantially matched as to blaze angle and number of rulings per mm. By way of example, each of the reflection gratings 11 and 17 is ruled at 600 lines per mm. The reflection gratings 11 and 17 are blazed so that first order diffraction dominates.

From Equations 4 and 5, it follows that the angle of diffraction depends on both angle of incidence and wavelength of the incident radiation. Those two parameters are inextricably mixed, and if neither is known, their determination requires use of the information obtained from, two independent optical channels of the spectral analyzer and direction indicator. For example, the angle of diffraction of an incoming beam having a wavelength of 1064 nanometers (nm) entering at a beam angle of 10 degrees is the same as that for an incoming beam having a wavelength of 694 nm entering at a beam angle of −2.77 degrees.

In operation, the location of the images on the linear detector arrays 15 and 21 will depend on the nature of the light radiation within the FOV of the detector system 10. When the incident light is collimated, the diffracted light will also be collimated. For a laser source, a focused spot is produced on each of the detector arrays 15 and 21. The location of each spot provides a measure of the angle of diffraction which, as discussed above, is a function of both the angle $\theta y$ and wavelength.

For a point source that is spectrally broad, the image on each detector array will not be a single focused interval along each array whose extent is determined by the spectral content of the source. Each illuminated detector element corresponds to an angle of diffraction from the associated grating, and detector element output level represents the amplitude of a portion of the spectrum. Thus, both the spectral signature of the point source and its angular position within the FOV can be determined when the information provided by the illuminated detector elements is suitably interpreted.

The respective values for the angle $\theta y$ and wavelength W can be determined from the left and right angles of diffraction $(D_L, D_R)$ as follows:

$$\theta y = \arcsin \frac{\sin D_R - \sin D_L}{2 \cos G} \quad \text{(Eq. 6)}$$

$$W = \frac{d}{2n}(\sin D_L + \sin D_R + 2 \sin G \cos \theta y) \quad \text{(Eq. 7)}$$

From the foregoing Equation 6, the angle $\theta y$ is determined and its value is substituted in Equation 7 to yield the wavelength W.

Since each of the elements of the detector arrays 15 and 21 provides an indication of the respective angles of diffraction, then with appropriate calibration and processing circuitry, the output the detector arrays 15 and 21 are utilized to provide appropriate angular values. Such angular values are then utilized to calculate the direction angle $\theta y$ and wavelength (W) in accordance with Equations 6 and 7.

In systems with less stringent resolution requirements which can tolerate look-up tables, Equations 6 and 7 can be utilized to generate the values for such look-up tables. Alternatively, the look-up tables can be generated empirically.

In the spectral analyzer and direction indicator system 10, the elements of the detector arrays 15 and 21 are elongated elements which are arranged parallel to the rulings on the reflection gratings 11 and 17. That is, the elements are parallel to the x-axis.

Figure 3A:
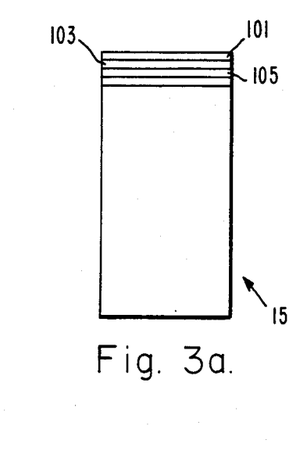
FIGS. 3a and 3b are schematic diagrams of a linear detector array and a segmented detector array which may be utilized in the detector system shown in FIG. 1.

FIG. 3a schematically shows the incident side of the detector array 15 and includes representative detector elements 101, 103, and 105. The position of the focused image in the direction of the b-axis is indicative of the angle of diffraction and can be used to determine the direction angle $\theta y$. Each detector element is elongated in the direction of the a-axis to allow for detection of a source angularly displaced in the direction of $\theta x$. For greater resolution of $\theta y$ and the angle of diffraction, narrower detector elements would allow for more elements per unit distance along the b-axis.

Figure 3B:
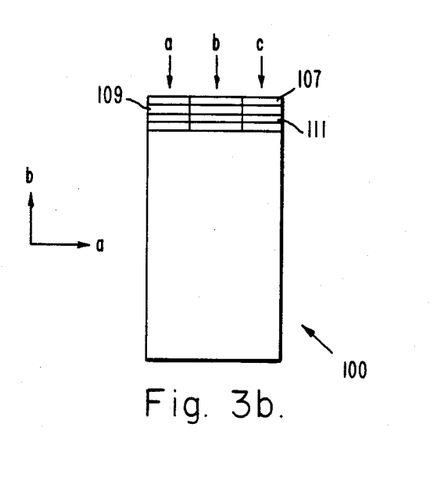

FIG. 3b schematically shows an alternative detector array 100 which includes a plurality of representative segmented elements 107, 109, and 111. Each segmented element includes segments identified by the suffixes a, b, and c. With such a segmented detector array, the detector outputs would have to be appropriately processes so that any output from each group of colinear segments would be recognized as being indicative of the same angle of diffraction $D_L$ or $D_R$.

The detector array 21 is similar to the detector array 15, and the position of the detected image thereon is indicative of both incidence direction $\theta y$ and angle of diffraction.

The detector array 25 is utilized to detect source direction along $\theta x$, and is similar to the detector array 11 shown in FIG. 3a. Specifically, the detector array 25 includes elongated detector elements parallel to the y-axis. Location of the image on the detector array 25 is indicative of the $\theta x$ direction of the source of radiation.

As with the detector arrays 15 and 21, the detector array 25 can include segmented detector elements similar to those shown in the detector array 100 of FIG. 3b, and wherein all of the colinear segments are indicative of the same source direction angle $\theta x$.

Figure 4:
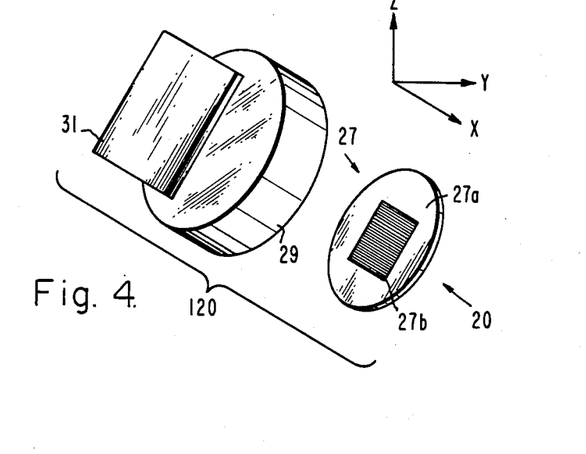
FIG. 4 is a perspective schematic diagram of a disclosed spectral analyzer and direction indicator system which utilizes a partially ruled flat mirror for providing both diffracted and simply reflected output radiation.

Referring now to FIG. 4, schematically shown therein is a spectral analyzer and direction indicator system 20 which includes a planar reflecting element 27 for providing both non-diffracted (zero-order) reflected radiation and diffracted (first order) reflected radiation. Specifically, the reflecting element 27 includes a non-ruled area 27a for providing non-diffracted (i.e., reflected) radiation, and further includes a ruled areas 27b for providing the first order diffracted reflected radiation. An analytical optical system 29, illustrated as a simple lens, focuses the non-diffracted and diffracted radiation to a detector array 31. It is contemplated that the detector array 31 includs a two-dimensional portion for providing information as to the angular direction of the radiation source.

The reflecting element 27, the analytical optical system 29, and the associated detector array 31 form an optical channel 120 which provides non-diffracted and diffracted optical information.

Figure 5:
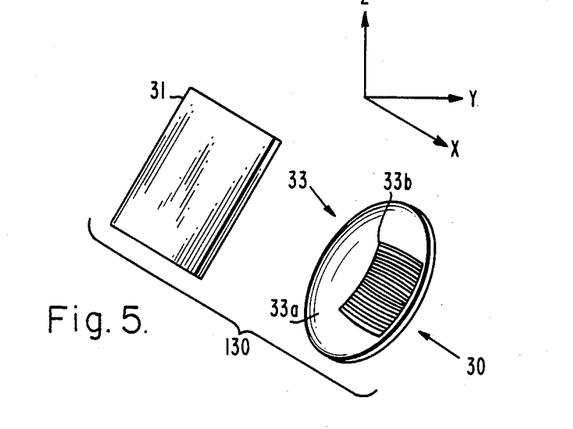
FIG. 5 is a perspective schematic diagram of a disclosed spectral analyzer and direction indicator system which utilizes a partially ruled concave mirror for providing focused dispersed and non-dispersed reflected incident radiation.

Referring now to FIG. 5, schematically shown therein is a spectral and direction indicator system 30 similar to the spectral analyzer and direction indicator system 20 of FIG. 4, and includes a concave reflecting element 33 which includes a non-ruled area 33a and a ruled area 33b. The non-ruled area 33a provides non-diffracted (zero order) reflected radiation and the ruled area 33b provides diffracted (first order) radiation. Since the reflecting element 33 is appropriately concave it tends to focus the reflected radiation to a detector array 31, which is similar to the detector array 31 in the spectral analyzer and direction indicator system 20. The concave reflector element 33 and the detector array 31 form an optical channel 130 for providing non-diffracted and diffracted optical information.

Figure 6:
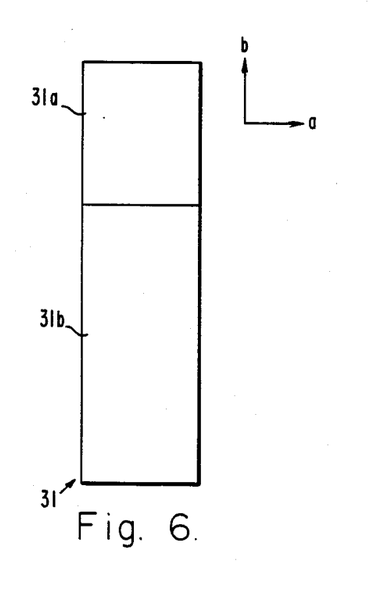
FIG. 6 is a schematic diagram of a detector array for use in the spectral analyzer and direction indicator systems of FIGS. 4 and 5.

Referring now to FIG. 6, schematically shown therein is the detector array 31 for use in the spectral analyzer and direction indicator systems 20 and 30. Specifically, the detector array includes a two-dimensional upper portion 31a which receives the non-diffracted reflected radiation. Since the detector array portion 31a is two-dimensional, it can provide information indicative of the $\theta x$ and $\theta y$ directions from which the radiation is being received. The remaining section 31b of the detector array 31 can be linear with elongated elements parallel to the a-axis. For considerations such as noise and sensitivity, the section 31b could include segmented detector elements.

The position of the non-diffracted image along the a-axis is indicative of $\theta x$ and its position along the b-axis is indicative of $\theta y$. The position of the diffracted image along the b-axis is indicative of the angle of diffraction and its position along the a-axis is indicative of $\theta x$. The position of the non-diffracted image also provides a directed indication of the angle of incidence as defined in Equation 4. Since angle of incidence is known, spectral content is determined by using the parameters and sign conventions set forth relative to the left side of FIG. 2, and by rewriting Equation 4 as follows:

$$W = d/n(\sin D_L + \sin I_L) \quad \text{(Eq. 8)}$$

The incidence angle $I_L$ is determined by the position of the undiffracted image along the b-axis. The diffraction angle $D_L$ is determined by the position of the diffracted image along the b-axis. With such angular information, Equation 8 is readily solved to determine wavelength W. It should be noted that as to the spectral analyzer and direction indicator systems 20 and 30 shown in FIGS. 4 and 5, conditions may exist wherein the diffracted image is focused on the two-dimensional area 31 of the detector 31. In that circumstance, there should be no confusion since the diffracted and undiffracted images will never reverse their relative positions. In FIGS. 4 and 5 the undiffracted image will always be above the diffracted image.

Figure 7:
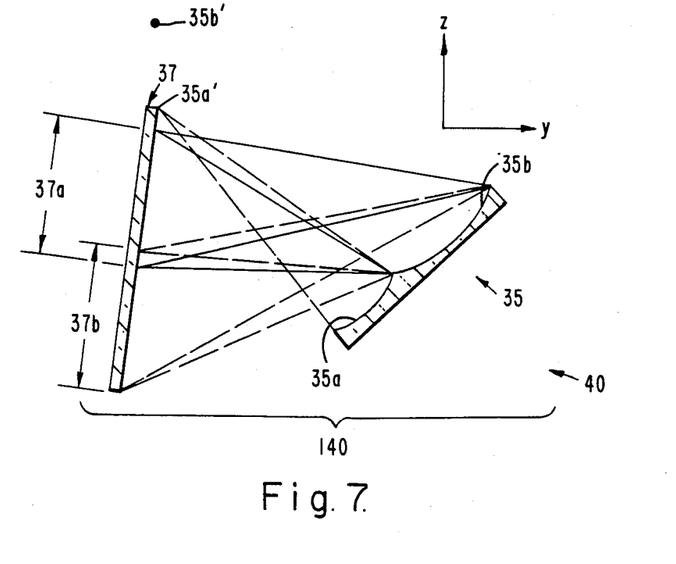
FIG. 7 is an elevation schematic diagram of a disclosed spectral system which includes a unitary reflector with ruled and non-ruled curved surfaces for providing focused output radiation that is respectively diffracted and reflected.

Referring now to FIG. 7, schematically shown therein is a spectral analyzer and direction indicator system 40 which has reduced internal field of view requirements. The system 40 includes a split reflector element 35 which has a smooth non-ruled concave section 35a and a ruled concave section 35b. The respective concave sections 35a and 35b focus the incident radiation on to a detector array 37. The reflector element 35 and the detector array 37 form an optical channel 140 which provides both non-diffracted and diffracted optical information.

The respective areas covered by short and long wavelength energy over the full fields of view are designated by respective indicia 37a and 37b. The positions of the foci of the smooth area of mirror 35a and of the zeroth order of grating 35b for objects at the top of the field of view are designated by respective indicia 35a' and 35b'.

The centers of curvature of the reflector sections 35a and 35b in FIG. 7 are appropriately offset relative to each other so that the non-diffracted image will always be above the diffracted image for all wavelengths of interest and for all directions in the external field of view. Such offset is chosen so as to insure that the non-diffracted and diffracted images are separated by at least three detector elements when the images are closest. Generally, the point of closest approach is designed to occur at the simultaneous occurrence of the minimum angle of incidence $(I_L)$ and the shortest wavelength $(W)$ of interest.

Figure 8:
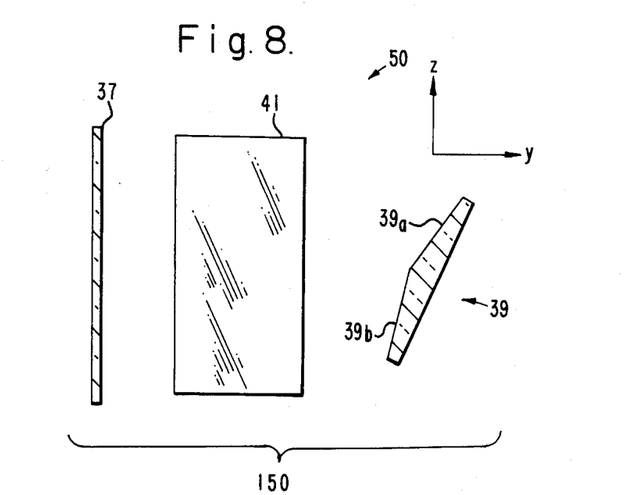
FIG. 8 is an elevation schematic of a disclosed spectral analyzer and direction indicator system which includes a unitary reflector with respective ruled and non-ruled planar surfaces which are not coplanar.

FIG. 8 shows a spectral analyzer and direction indicator system 50 with an internal field of view comparable to the system 40 of FIG. 7. The system 50 includes a split reflector element 39 which has a planar non-ruled section 39a and a planar ruled section 39b. The reflected radiation is focused by an optical system 41 to a detector array 37 which is the same as the detector array 37 in the system 40. The reflector element 39 and the detector array 37 form an optical channel 150 which provide non-diffracted and diffracted optical information.

The angle between the reflector sections 39a and 39b may be acute or obtuse, depending on the particular optical design. In all cases, however, these elements will be appropriately angled relative to each other so that the diffracted and undiffracted images will not interchange their relative positions. For example, in FIG. 8 the undiffracted image will always be above the diffracted imaged for all wavelengths of interest and for all directions within the external field of view. As discussed above relative to the system 40 of Figure, the relative position of the sections 39a and 39b must allow for minimum separation of at least three detector elements between non-diffracted and diffracted images.

Figure 9:
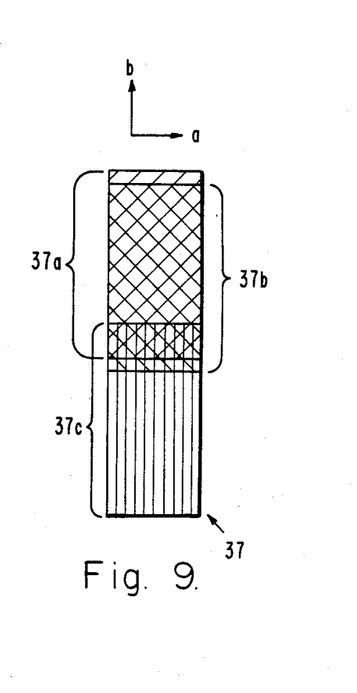
FIG. 9 is a schmatic diagram illustrating the locations of the images produced on the detector array of the spectral analyzer and direction indicator systems of FIGS. 7 and 8.

FIG. 9 schematically illustrates that under any given set of conditions, differently processed rays illuminated different sections of the detector array 37. For example, undiffracted (i.e., reflected) radiation would illuminate anywhere within the detector section 37a. Diffracted radiation of the shortest wavelength of interest would illuminate anywhere within the detector section 37b. Diffracted radiation of longest wavelength of interest would illuminate anywhere within the detector section 37c. While the different sections overlap, confusion is avoided since, as discussed above, the respective reflecting sections 39a and 39b are offset so that the diffracted and undiffracted images will not interchange their relative positions. For example, in FIG. 9, the undiffracted image will always be above the diffracted imaged.

The detector in FIG. 9 can be linear or segmented. Segmentation can be introduced to improve sensitivity or to provide the ability to resolve image position in the direction parallel to the a-axis. If full two-dimensional capability is desired for such an array, segmentation of all of elements in the array must be fine enough to provide the required angular resolution.

The angular directions $\theta x$ and $\theta y$ and the wavelength W are determined in the same manner as with the spectral analyzer and direction indicator systems 20 and 30, discussed above. Briefly, the position of the undiffracted image is indicative of the source angular directions $\theta x$ and $\theta y$. The position of the diffracted image contains information on both wavelength and angular direction. Since angle of incidence is known from the reflected image, wavelength can be determined using Equation 8 above.

Although the foregoing has been a description and illustration of specific embodiments of the invention, various modifications and changes thereto can be made by persons skilled in the art without departing from the scope and spirit of the invention as defined by the following claims.

What is claimed is:

1. A spectral analyzer and direction indicator system for receiving collimated or essentially collimated incident radiation comprising:
   first optical means responsive to the collimated or essentially collimated incident radiation for providing first optical diffraction information which is a function of spectral content and incidence direction of the collimated or essentially collimated incident radiation;
   second optical means responsive to the collimated or essentially collimated incident radiation for providing second optical diffraction information which is a function of spectral content and incidence direction of the collimated or essentially collimated incident radiation;
   detector means illuminated by said first and second optical diffraction information for providing, as a function of the locations on said detector means illuminated by said first and second optical diffraction information, detected information for identifying as to the collimated or essentially collimated incident radiation both the spectral content and a first angular incidence direction;
   third optical means for providing non-diffracted optical information which is a function of incidence direction of the collimated or essentially collimated incident radiation; and
   further detector means illuminated by said non-diffracted optical information for providing, as a function of locations on said further detector means illuminated by said third optical information, detected information indicative of a second angular incidence direction of the collimated or essentially collimated incident radiation.

2. The spectral analyzer and direction indicator system of claim 1 wherein each of said first and second optical means includes a spectrally dispersing element.

3. The spectral analyzer and direction indicator system of claim 2 wherein said spectrally dispersing element comprises a reflection grating.

4. The spectral analyzer and direction indicator system of claim 1 wherein said third optical means includes refractive means for focusing the collimated or essentially colimated incident radiation to said further detector means.

5. A spectral analyzer and direction indicator system for receiving collimated or essentially collimated incident radiation comprising:
   reflective optical means responsive to the collimated or essentially collimated incident radiation for providing non-dispersed optical information indicative of incidence direction of the collimated or essentially collimated incident radiation and for providing spectrally dispersed optical information; and
   detector means illuminated by said non-dispersed optical information and said dispersed optical information for providing, as a function of the locations on said detector means illuminated by said non-dispersed optical information and said dispersed optical information, detected information for identifying as to the collimated or essentially collimated incident radiation the incidence direction and the spectral content.

6. The spectral analyzer and direction indicator system of claim 5 wherein said reflective optical means includes a mirror having a ruled portion and a non-ruled portion.

7. The spectral analyzer and direction indicator system of claim 6 wherein said mirror is planar.

8. The spectral analyzer and direction indicator system of claim 6 wherein said mirror is concave.

9. The spectral analyzer and direction indicator system of claim 5 wherein said reflective optical means comprises a reflector having a smooth non-ruled section and a ruled section.

10. The spectral analyzer and direction indicator system of claim 9 wherein said non-ruled section is concave and said ruled section is concave.

11. The spectral analyzer and direction indicator system of claim 10 wherein the respective centers of curvature of said non-ruled and ruled sections are offset relative to each other.

12. The spectral analyzer and direction indicator system of claim 9 wherein said smooth non-ruled section is planar and said ruled section is planar.

13. The spectral analyzer and direction indicator system of claim 12 wherein said smooth non-ruled planar section and said ruled planar section are angularly offset relative to each other.

14. A spectral analyzer and direction indicator system for receiving collimated or essentially collimated incident radiation comprising:

reflective optical means for providing non-dispersed optical information that is a function of the incidence direction of the collimated or essentially collimated incident radiation; and dispersing optical means for providing dispersed optical information that is a function of both the spectral content and the incidence direction of the collimated or essentially collimated incident radiation; and means for focusing said optical information to provide images of said optical information; and detector means illuminated by said focused optical information for providing, as a function of the locations non said detector means illuminated by said focused optical information, information indicative of the incidence direction and the spectral content of the collimated or essentially collimated incident radiation.

15. The spectral analyzer and direction indicator of claim 14 wherein said reflective optical means includes a flat mirror and said dispering optical means includes a flat diffraction grating.

16. The spectral analyzer and direction indicator of claim 14 wherein said reflective optical means and said dispersing optical means are anglularly offset with respect to each other.

17. The spectral analyzer and direction indicator of claim 14 wherein said angular offset of said reflecting and dispersing optical means is such that the relative order of position of said images of said focused optical information is maintained over all optical conditions of interest.

* * * * *